Nov. 15, 1966 L. J. CAMPBELL 3,285,488

MAGNETIC TAPE HANDLER WITH VACUUM PRESSURE PAD

Filed Oct. 7, 1964

Larry J. Campbell,
INVENTOR.
Harry M. Saragovitz
BY Edward J. Kelly
Herbert Berl
ATTORNEYS

United States Patent Office 3,285,488
Patented Nov. 15, 1966

3,285,488

MAGNETIC TAPE HANDLER WITH VACUUM PRESSURE PAD

Larry J. Campbell, St. Paul, Minn., assignor, by mesne assignments, to The United States of America as represented by the Secretary of the Army Filed Oct. 7, 1964, Ser. No. 402,368
1 Claim. (Cl. 226—196)

This invention relates to a magnetic tape handler in which the tape handler is provided with a vacuum pressure pad to clean the tape prior to passing over the read/write head and to suppress tape bounce due to high speed operation.

In magnetic tape handlers, there is a need for a device that will suppress tape bounce due to high speed operation and also clean the tape before passing over the read/write head.

Therefore, it is an object of this invention to provide a vacuum pressure pad for suppressing tape bounce due to high speed operation.

Another object of this invention is to provide a vacuum pressure pad that will clean the tape just before passing over a read/write head.

A further object of this invention is to eliminate the need for a conventional pressure pad on a read/write head of a magnetic tape handler.

Still another object of this invention is to provide for additional tape guidance as the tape passes across the read/write head to prevent skew of the tape.

Yet another object of this invention is to provide a vacuum pressure pad that can easily be incorporated into existing tape units.

In accordance with this invention, a magnetic tape handler is provided with a vacuum pressure pad mounted adjacent each side of a read/write head of the tape handler to clean the tape, guide the tape and suppress bounce of the tape as the tape passes over the read/write head.

This invention may be better understood by referring to the drawing forming part of this specification, and in which like numerals are employed to designate corresponding parts throughout the same, and wherein.

Figure 1:
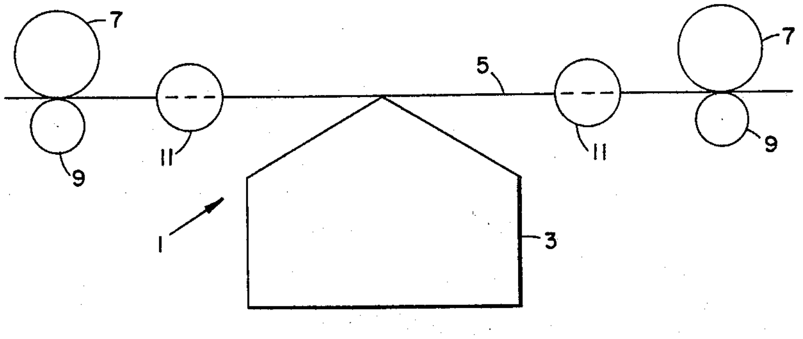
FIGURE 1 is a schematic view illustrating portions of a tape handler and including a vacuum pressure pad.

This invention may be better understood by referring to the drawing wherein, numeral 1 designates a tape handler device as shown in FIGURE 1, and includes a read/write head 3 over which a magnetic tape 5 is caused to pass by capstans 7 and pinch rollers 9. Vacuum pressure pads 11 are located on either side of the read/write head 3 between the read/write head and the capstans 7.

Vacuum pressure pads 11 clean magnetic tape 5, guide the tape over the read/write head and suppress tape bounce as the tape passes over the read/write head.

Figure 2:
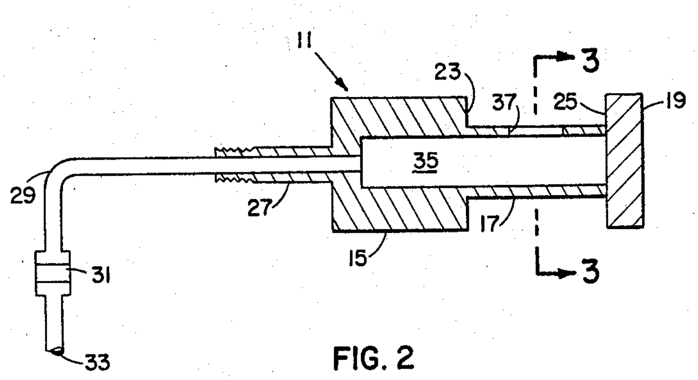
FIGURE 2 is a sectional view of a vacuum pressure pad.
Figure 3:
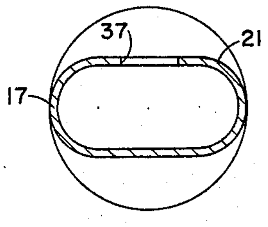
FIGURE 3 is a sectional view taken on line 3—3 of FIGURE 2.

Referring to FIGURE 2, each vacuum pressure pad 11 has a body portion that includes a base section 15, an intermediate section 17, and a top section 19. Intermediate section 17 has a flat side 21 (see FIGURE 3) that is flattened to increase vacuum effectiveness and prevent excessive tape wear. Base section 15 and top section 19 have surfaces 23 and 25 respectively for contacting the outer periphery of the tape and guiding the tape in a straight line across the read/write head.

A threaded and hollow mounting stud 27, integral with base section 15, is adapted for mounting the vacuum pressure pad on the tape handler device and for connecting the vacuum pressure pad to hose or pipe 29 that has a removable filter 31 mounted therein. An open end 33 of pipe 29 is adapted to be connected to a vacuum pump (not shown). The vacuum pressure in hose 29 is communicated to chamber 35 in the body portion and to slot 37 in flat side 21 to pull on the tape and to clean the tape as it passes over the slot in the flat side.

In operation, tape 5 is fed across read/write head 3 either from left to right or from right to left by the capstans 7 and rollers 9. As the tape is fed across read/write head 3, the vacuum pressure on the tape at slot 37 of each vacuum pressure pad 11 causes the tape to move smoothly across read/write head 3 rather than flutter or bounce across the head during starting or stopping, and when the tape is continuously fed across the read/write head. The vacuum pressure on the tape will also clean dust particles from the tape before the tape passes over the read/write head.

It is to be understood that the form of my invention, herewith shown and described, is to be taken as a preferred example of the same, and that various changes in the size, shape and arrangement of parts may be resorted to, without departing from the spirit of my invention, or the scope of the subjoined claim.

I claim:

A vacuum pressure pad for use on a tape handler including: a body portion defining a base section, an intermediate section and a top section; said base section and top section defining surfaces for guiding the outer periphery of a tape, said intermediate section having a slightly flattened wall that merges into curved surfaces and a single slot in said flattened wall, said slot communicating with a chamber in said body portion; a screw threaded mounting stud integral with said base section for mounting said vacuum pressure pad on said tape handler device and a passage in said stud in communication with said chamber, and means in communication with said chamber and passage for creating a vacuum in said chamber.

References Cited by the Examiner

UNITED STATES PATENTS

| | | | |
|---|---|---|---|
| 2,778,634 | 1/1957 | Gams | 226—95 |
| 2,994,489 | 8/1961 | Hare | 242—75.2 |
| 3,091,794 | 6/1963 | Pillsbury | 226—97 X |
| 3,179,318 | 4/1965 | Blom | 226—190 |

M. HENSON WOOD, Jr., *Primary Examiner.*

R. A. SCACHER, *Assistant Examiner.*